(12) United States Patent
Krishnan et al.

(10) Patent No.: US 12,301,454 B2
(45) Date of Patent: *May 13, 2025

(54) SUPPORT FOR MULTI-AZ MANAGEMENT APPLIANCE NETWORKING

(71) Applicant: VMware LLC, Palo Alto, CA (US)

(72) Inventors: Manoj Krishnan, Santa Clara, CA (US); Gabriel Tarasuk-Levin, Sunnyvale, CA (US)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,884

(22) Filed: May 10, 2023

(65) Prior Publication Data

US 2023/0283546 A1    Sep. 7, 2023

Related U.S. Application Data

(63) Continuation of application No. 17/580,414, filed on Jan. 20, 2022, now Pat. No. 11,683,267, which is a
(Continued)

(30) Foreign Application Priority Data

Jul. 31, 2018 (IN) .............................. 201841028749

(51) Int. Cl.
    *H04L 45/586*     (2022.01)
    *G06F 9/455*      (2018.01)
    *H04L 61/5061*    (2022.01)

(52) U.S. Cl.
CPC ........ *H04L 45/586* (2013.01); *G06F 9/45558* (2013.01); *H04L 61/5061* (2022.05); *G06F 2009/45595* (2013.01)

(58) Field of Classification Search
CPC .............. H04L 45/586; H04L 61/5061; G06F 9/45558; G06F 2009/45595
See application file for complete search history.

(56) References Cited

U.S. PATENT DOCUMENTS 8,433,802 B2    4/2013   Head et al.
8,874,749 B1 * 10/2014   Vittal .................. H04L 67/1001
                                                      709/226
(Continued)

OTHER PUBLICATIONS

Non-Final Office Action received for U.S. Appl. No. 17/496,434, mailed on Dec. 19, 2022, 15 pages.
(Continued)

*Primary Examiner* — Saad A. Waqas
(74) *Attorney, Agent, or Firm* — Quarles & Brady LLP

(57) ABSTRACT

Processes for managing computing processes within a plurality of data centers configured to provide a cloud computing environment are described. An exemplary process includes executing a process on a first host of a plurality of hosts. When the process is executing on the first host, a first network identifier associated with the plurality of hosts is not a network identifier of a pool of network identifiers associated with the cloud computing environment and first and second route tables respectively corresponding to first and second data centers of the plurality of data centers associate the first network identifier with the first host. The exemplary process further includes detecting an event associated with the process. In response to detecting the event associated with the process, the first and second route tables are respectively updated to associate the first network identifier with a second host of the plurality of hosts.

32 Claims, 5 Drawing Sheets

Related U.S. Application Data continuation of application No. 16/507,081, filed on Jul. 10, 2019, now Pat. No. 11,265,243.

(56) References Cited

U.S. PATENT DOCUMENTS

| | | | |
|---|---|---|---|
| 10,148,493 | B1 | 12/2018 | Ennis et al. |
| 10,608,942 | B1* | 3/2020 | Shaikh .................... H04L 45/70 |
| 11,106,551 | B1 | 8/2021 | Featonby et al. |
| 11,169,893 | B2 | 11/2021 | Krishnan et al. |
| 11,194,680 | B2 | 12/2021 | Konka et al. |
| 2009/0055507 | A1 | 2/2009 | Oeda |
| 2009/0119664 | A1 | 5/2009 | Pike et al. |
| 2011/0321041 | A1 | 12/2011 | Bhat et al. |
| 2013/0044641 | A1* | 2/2013 | Koponen .............. H04L 41/122 370/255 |
| 2015/0012665 | A1 | 1/2015 | Kang et al. |
| 2015/0100958 | A1* | 4/2015 | Banavalikar .......... G06F 9/5083 718/1 |
| 2015/0237132 | A1 | 8/2015 | Antony |
| 2015/0355982 | A1 | 12/2015 | Ganesan et al. |
| 2016/0085643 | A1 | 3/2016 | Mcalister et al. |
| 2017/0168903 | A1 | 6/2017 | Dornemann et al. |
| 2017/0177840 | A1 | 6/2017 | Srivastava et al. |
| 2018/0173554 | A1 | 6/2018 | Caradonna et al. |
| 2019/0108099 | A1* | 4/2019 | Mazumdar .......... G06F 21/6218 |
| 2020/0042411 | A1 | 2/2020 | Krishnan et al. |
| 2020/0044966 | A1 | 2/2020 | Krishnan et al. |
| 2022/0027244 | A1 | 1/2022 | Krishnan et al. |
| 2022/0150165 | A1 | 5/2022 | Krishnan et al. |

OTHER PUBLICATIONS

Notice of Allowance received for U.S. Appl. No. 17/496,434, mailed on May 18, 2023, 6 pages.
Chen et al., "Survivability Modeling and Analysis of Cloud Service in Distributed Data Centers", Online available at: https://academic.oup.com/comjnl/article-abstract/61/9/1296/4683984, The Computer Journal, vol. 61, No. 9, Dec. 4, 2017, pp. 1296-1305.
Final Office Action received for U.S. Appl. No. 16/507,081, mailed on Sep. 28, 2021, 22 pages.
Loveland et al., "Leveraging virtualization to optimize high-availability system configurations", IBM Systems Journal, vol. 47, No. 4, DOI: 10.1147/SJ.2008.5386515, 2008, pp. 591-604.
Non-Final Office Action received for U.S. Appl. No. 16/507,081, mailed on May 12, 2021, 21 pages.
Non-Final Office Action received for U.S. Appl. No. 16/507,083, mailed on Mar. 12, 2021, 18 pages.
Non-Final Office Action received for U.S. Appl. No. 17/580,414, mailed on Oct. 27, 2022, 29 pages.
Notice of Allowance received for U.S. Appl. No. 16/507,081, mailed on Nov. 10, 2021, 8 pages.
Notice of Allowance received for U.S. Appl. No. 16/507,083, mailed on Jul. 7, 2021, 22 pages.
Notice of Allowance received for U.S. Appl. No. 17/580,414, mailed on Feb. 15, 2023, 8 pages.

* cited by examiner

SUPPORT FOR MULTI-AZ MANAGEMENT APPLIANCE NETWORKING

RELATED APPLICATIONS

This application is a continuation of U.S. application Ser. No. 17/580,414, filed on Jan. 20, 2022, entitled "SUPPORT FOR MULTI-AZ MANAGEMENT APPLIANCE NETWORKING," which claims priority to U.S. application Ser. No. 16/507,081 (now U.S. Pat. No. 11,265,243), filed on Jul. 10, 2019, entitled "SUPPORT FOR MULTI-AZ MANAGEMENT APPLIANCE NETWORKING," which claims priority to Indian Application Serial No. 201841028749, filed on Jul. 31, 2018, entitled "SUPPORT FOR MULTI-AZ MANAGEMENT APPLIANCE NETWORKING." The contents of each of these applications are hereby incorporated by reference in their entireties.

FIELD

The present disclosure relates generally to cloud computing, and more specifically to managing computing processes within data centers providing a cloud computing environment.

BACKGROUND

Cloud architectures are used in cloud computing and cloud storage systems for offering infrastructure-as-a service (IaaS) cloud services (e.g., Amazon Web Services provided by Amazon Web Services, Inc.). Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks.

SUMMARY

Some cloud computing architectures use data centers to provide cloud resources. For example, data centers can provide hardware resources that support executing computing processes. In some instances, it is desirable for a computing process to communicate with multiple data centers. For example, a process executing on a first data center and communicating with a second data center can failover to the second data center (e.g., if the first data center fails). Thus, allowing processes to communicate with multiple data centers can result in improved fault tolerance and improved process availability.

In some embodiments, a method for managing processes within a plurality of data centers configured to provide a cloud computing environment associated with a pool of network identifiers is described. The method includes executing a process on a first host of a plurality of hosts. When the process is executing on the first host, a first network identifier associated with the plurality of hosts is not a network identifier of the pool of network identifiers. When the process is executing on the first host, a first route table corresponding to a first data center of the plurality of data centers associates the first network identifier with the first host and a second route table corresponding to a second data center of the plurality of data centers associates the first network identifier with the first host. The method further includes detecting an event associated with the process. The method further includes, in response to detecting the event associated with the process, updating the first route table to associate the first network identifier with a second host of the plurality of hosts and updating the second route table to associate the first network identifier with the second host.

In some embodiments, a non-transitory computer-readable storage medium storing one or more programs configured to be executed by one or more processors for managing processes within a plurality of data centers configured to provide a cloud computing environment associated with a pool of network identifiers is described. The one or more programs include instructions for executing a process on a first host of a plurality of hosts. When the process is executing on the first host, a first network identifier associated with the plurality of hosts is not a network identifier of the pool of network identifiers. When the process is executing on the first host, a first route table corresponding to a first data center of the plurality of data centers associates the first network identifier with the first host and a second route table corresponding to a second data center of the plurality of data centers associates the first network identifier with the first host. The one or more programs further include instructions for detecting an event associated with the process. The one or more programs further include instructions for updating the first route table to associate the first network identifier with a second host of the plurality of hosts and updating the second route table to associate the first network identifier with the second host.

In some embodiments, a computer system for managing processes within a plurality of data centers configured to provide a cloud computing environment associated with a pool of network identifiers is described.

DETAILED DESCRIPTION

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

Figure 1:
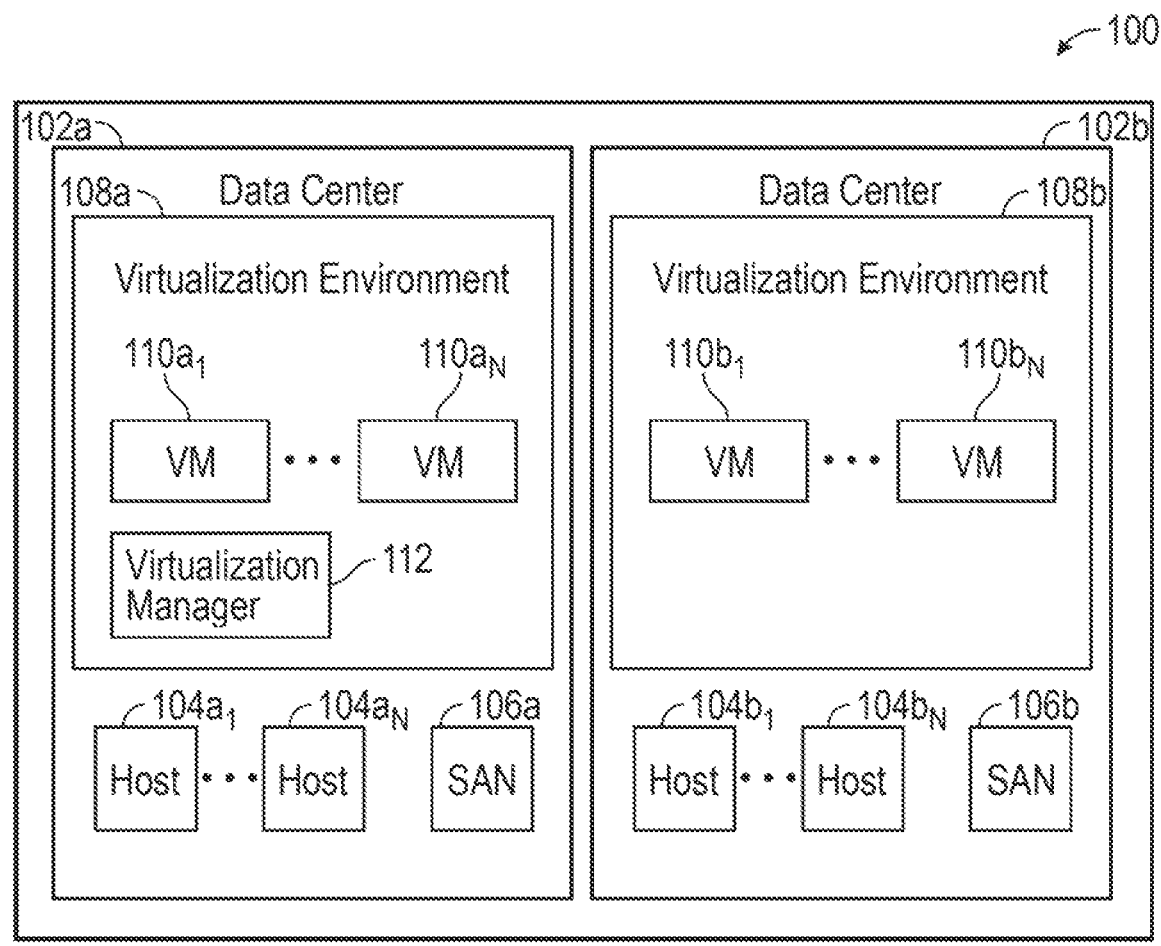
FIG. 1 is a block diagram illustrating an exemplary cloud computing system according to an embodiment of the invention.

FIG. 1 is a block diagram illustrating an exemplary cloud computing system 100 according to an embodiment of the invention. Cloud computing system includes data centers 102a and 102b configured to provide a cloud computing environment. Although FIG. 1 shows cloud computing system 100 as including two data centers (e.g., 102a and 102b), it is to be understood that cloud computing system 100 can include any number of data centers (e.g., a single data center, more than two data centers).

In some embodiments, each data center 102a, 102b corresponds to one or more physical data centers corresponding to a particular location or region. In this manner, each data center 102a, 102b may comprise an availability zone (AZ), for instance, of a particular region. An availability zone for a particular region comprises a distinct (e.g., from the other availability zones of the region) location within the region served by one or more distinct data centers. In some examples, one or more availability zones of a region provide redundancy. Availability zones may be fully redundant with one or more other availability zones and/or may be partially redundant with one or more other availability zones. It will appreciated be that providing redundancy in this manner provides high availability of both data and resources in a cloud computing environment.

In some embodiments, each data center 102a, 102b provides resources to the cloud computing system 100. Resources provided in this manner include, but are not limited to, processing (e.g., computational), network, memory, and/or storage resources.

By way of example, data center 102a may include one or more hosts $104a_1$-$104a_N$. Each host $104a_1$-$104a_N$ comprises, for instance a designated amount of processing, network, memory, and/or storage resources. In some examples, hosts $104a_1$-$104a_N$ are configured to provide a same amount of resources, and in other examples, hosts $104a_1$-$104a_N$ are configured to provide different amounts of resources, respectively. Data center 102a further includes storage area network (SAN) 106a. SAN 106a is configured to provide storage resources as known in the art. While description is made herein with respect to the operation of the hosts $104a_1$-$104a_N$ and SAN 106a of data center 102a, it will be appreciated that those of hosts $104b_1$-$104b_N$ and SAN 106b of data center 102b provide analogous functionality, respectively. Exemplary components of a host (e.g., any of hosts 104a or hosts 104b) are described below with respect to FIG. 2.

Data center 102a further includes a virtualization environment 108a that, in some embodiments, is provided using hardware resources (e.g., hosts 104a1-104aN and/or SAN 106a). Virtualization environment 108a includes virtualization manager 112 and a plurality of virtual machines (VMs) $110a_1$-$110a_N$.

In some embodiments, one or more of the hosts 104a1-104aN are configured to execute a hypervisor by which resources of a respective host are shared amongst VMs corresponding to the host. In some embodiments, the hypervisor is a type-1 hypervisor. Accordingly, the hypervisor may be implemented directly on the hardware components of a host as a hardware virtualization engine. In other examples, the hypervisor is a type-2 hypervisor. Accordingly, the hypervisor may execute in combination with other software (i.e., operating system) of the host. For instance, in some embodiments, the hypervisor is a VMware ESXi hypervisor provided as part of the VMware vSphere solution, made commercially available from VMware Inc.

In some embodiments, virtualization manager (virtual machine manager) 112 is configured to manage hosts and/or VMs of virtualization environment 108a. In some examples, managing VMs in this manner includes instantiating, removing, and/or migrating VMs, as well optimizing the allocation of resources to the VMs during operation. By way of example, if resource demands exceed a current capability of hosts 104a of data center 102a, virtualization manager 112 can request that one or more additional hosts be injected into the cluster of hosts. Virtualization manager 112 can then initiate a specific number of VMs 110a on the injected host of data center 102a to provide one or more services using the newly allocated resources. In some embodiments, virtualization manager 112 monitors resource consumption levels and adjusts the amount of available resources as needed. In some embodiments, virtualization manager 112 further carries out administrative tasks for data center 102a, such as load balancing between hosts, enforcing various policies, and/or updating host firmware and software.

In some embodiments, virtualization manager 112 is implemented as a process executing on a VM (e.g., any one of VMs $110a_1$-$110a_N$ or $110b_1$-$110b_N$). In some embodiments, virtualization manager 112 is a process that executes on a server (e.g., host) of cloud computing system 100 separate from hosts 104a and 104b. An exemplary virtualization manager is the vCenter™ Server product made commercially available by VMware, Inc. However, it should be recognized that any suitable virtualization manager may be used to implement virtualization manager 112.

Further, although FIG. 1 shows that virtualization manager 112 is implemented within data center 102a, is to be understood that virtualization manager can be implemented within any data center of cloud computing system 100, such as data center 102b. Similarly, in some embodiments, the management capabilities of virtualization manager 112 are not limited to the data center in which the virtualization manager is implemented. For example, in some embodiments, virtualization manager 112 additionally manages hosts and/or VMs of other data centers, such as data center 102b (e.g., by managing VMs 110b on hosts 104b). In some embodiments, virtualization manager 112 carries out administrative tasks for the entire cloud computing system 100.

In some embodiments, multiple instances of virtualization manager 112 are simultaneously executing in cloud computing environment 100. For instance, in some examples, one or more failover instances of virtualization manager 112 are provided for process redundancy. In this manner, if virtualization manager 112 fails (e.g., due to VM failure or host failure), a redundant instance of the virtualization manager may assume operation on behalf of the failed instance. In some embodiments, one or more failover instances are implemented within a data center different from the data center of virtualization manager 112. For example, if virtualization manager 112 is implemented as a process executing on VM $110a_1$, a failover instance of virtualization manager 112 (not shown) can be implemented as a process executing on VM $110b_1$.

In some embodiments, a VM executing the virtualization manager 112 is migrated between hosts, and as a result, virtualization manager 112 is migrated between hosts. Virtualization manager 112 can be migrated in this manner between hosts of the same data center, or between hosts of different respective data centers. For example, if virtualization manager is implemented as a process executing on VM $110a_1$ on host $104a_1$, VM $110a_1$ can be migrated to host $104a_N$ or to host $104b_1$ such that virtualization manager is implemented as a process executing on host $104a_N$ or on host $104b_1$, respectively.

Figure 2:
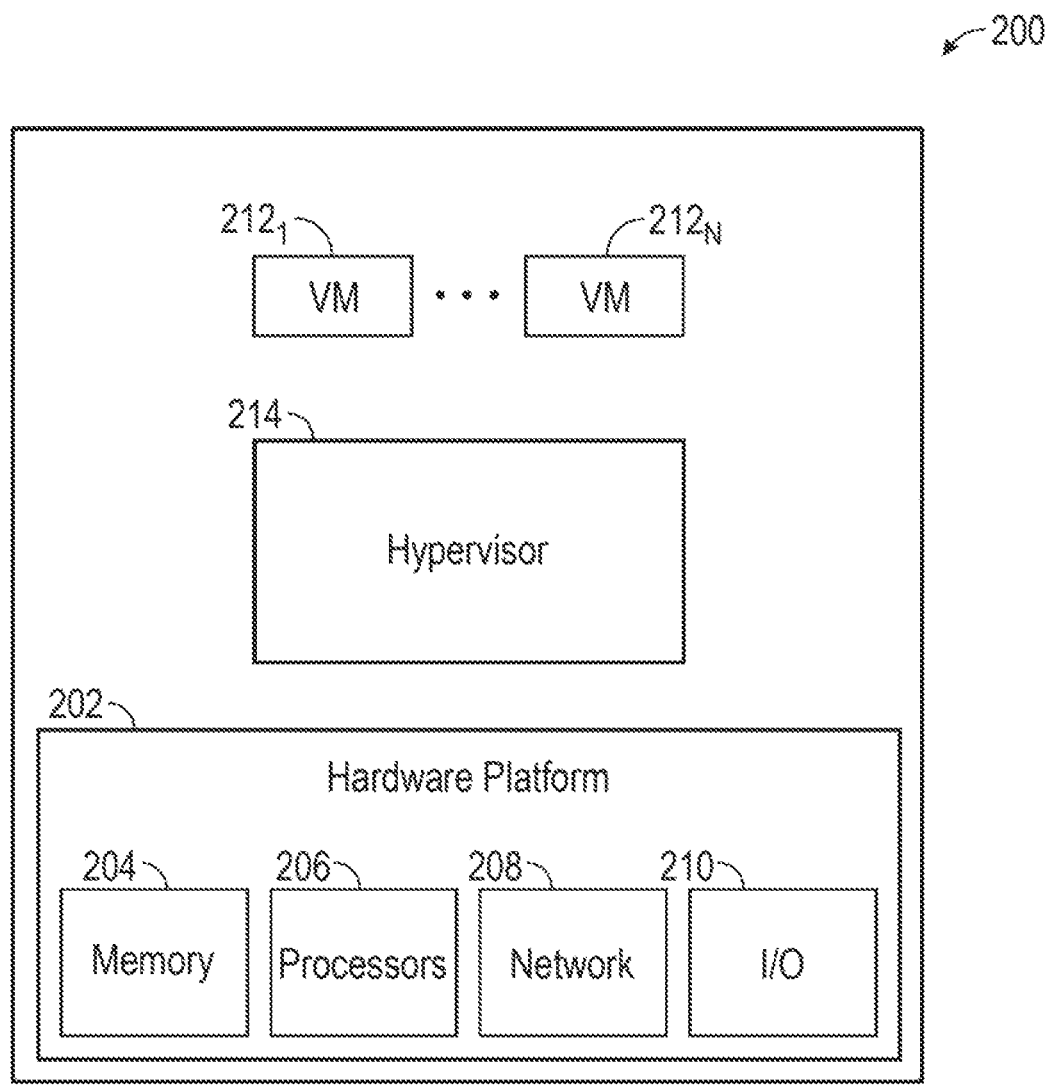
FIG. 2 is a block diagram illustrating an exemplary host according to an embodiment of the invention.

Turning now to FIG. 2, an exemplary block diagram illustrating an exemplary host 200 according to an embodiment of the invention is shown. In some embodiments, one or more of hosts 104 and 104b are implemented using host 200.

Host 200 includes hardware platform 202 including memory 204, one or more processors 206, network interface 208, and various I/O devices 210. Memory 204 includes random access memory (RAM), including but not limited to volatile RAM (e.g., DRAM, SRAM) and non-volatile RAM (e.g., NAND). Memory 204 further includes computer-readable storage medium. The computer-readable storage medium is, for example, tangible and non-transitory. For example, memory 204 includes high-speed random access memory and also includes non-volatile memory, such as one or more magnetic disk storage devices, flash memory devices, or other non-volatile solid-state memory devices. In some embodiments, the computer-readable storage medium of memory 204 stores instructions for performing the methods and processes described herein. In some embodiments, hardware platform 202 also includes other components, including power supplies, internal communications links and busses, peripheral devices, controllers, and many other components.

In some embodiments, hypervisor 214 executes using one or more components of hardware platform 202. Hypervisor 214 is a software layer that provides an execution environment within which multiple VMs $212_1 \ldots 212_N$ are concurrently executed. The execution environment of each VM 212 includes virtualized components analogous to those comprising hardware platform 202 (e.g. virtualized processor(s), virtualized memory, virtualized network interface(s) (e.g., virtualized network interface card(s), etc.). In this manner, hypervisor 214 provides an intermediate layer between VMs 212 and hardware platform 202, while enabling VMs 212 to share the physical resources of hardware platform 202. As a result, each VM 212 operates as though it has its own dedicated computing resources.

Figure 3:
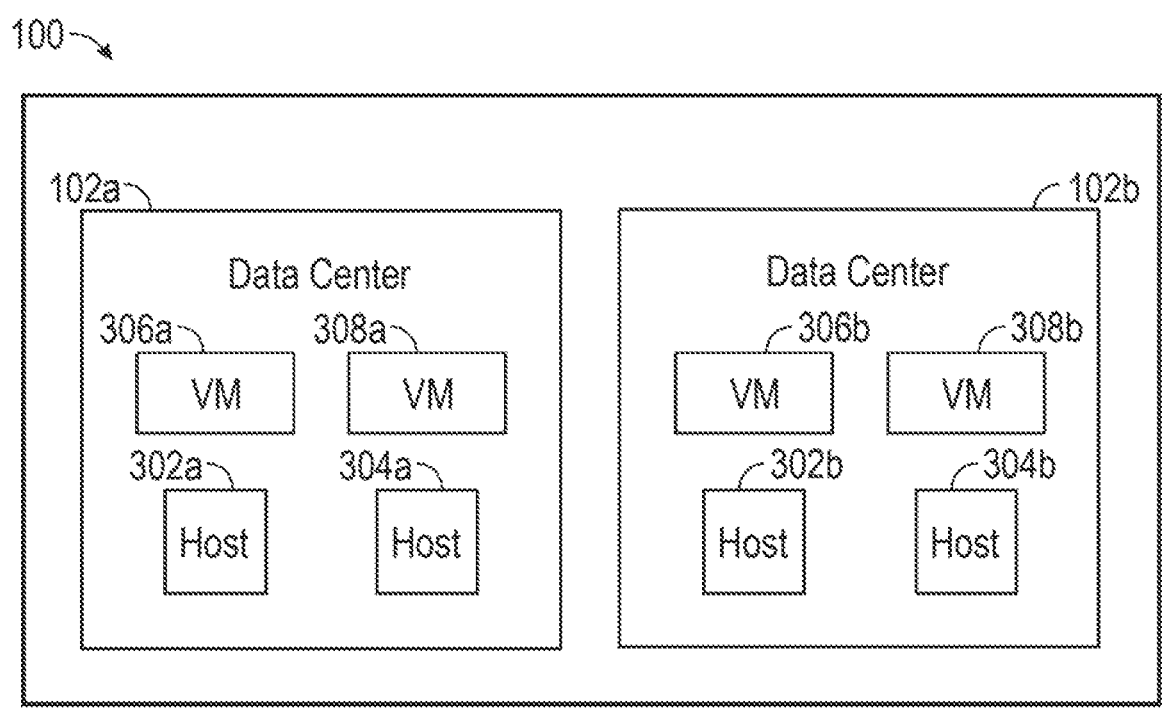
FIG. 3 is a block diagram illustrating a plurality of data centers configured to provide a cloud computing environment according to an embodiment of the invention.

Turning now to FIG. 3, a block diagram of a plurality of data centers (e.g., 102a and 102b) configured to provide a cloud computing environment according to an embodiment of the invention is shown. The hosts and VMs of FIG. 3 may respectively be implemented as any of the hosts and VMs previously discussed with respect to FIGS. 1 and 2. Further, although FIG. 3 depicts two data centers having two hosts each of which correspond to a respective VM, one of skill in the art will understand that the below discussion may apply to any number of data centers having any number of hosts and/or VMs, respectively.

In some embodiments, a cloud computing environment, such as cloud computing environment 100 (FIG. 1), employs a respective pool of network identifiers (e.g., IP addresses, MAC addresses, etc.). In some embodiments, each data center of the cloud computing environment is associated with one or more respective sets of network identifiers within the pool of network identifiers. For example, data center 102a is associated with a first set of network identifiers (e.g., a first subnet), and data center 102b is associated with a different second set of network identifiers (e.g., a second subnet). In some embodiments, a set of network identifiers includes one or more subnets. In some embodiments, address ranges of subnets are mutually exclusive such that no two subnets include a same address.

In some embodiments, a host of a data center is assigned one or more network identifiers. The one or more network identifiers may include or exclude network identifiers within the set of network identifiers associated with the corresponding data center. For example, host 302a may be assigned to a first subnet and host 302b may be assigned to a second subnet. As another example, both hosts 302a and 302b may be assigned to respective network identifiers not within the pool of network identifiers. By way of example, a subnet may be assigned to data center 102a and host 302a may be assigned a network identifier not included in the subnet.

In some embodiments, the VM(s) corresponding to a host may be assigned to the same subnet. For example, VM 306a may be assigned to the first subnet and VM 308b may be assigned to the second subnet. The VM(s) and host(s) assigned to the same subnet may each be assigned unique network identifiers within the subnet. In other embodiments, VMs and hosts may be assigned to different subnets, respectively.

In some embodiments, communications of a host are implemented, at least in part, using the respective assigned network identifier of the host. It will be appreciated that communication of a host may refer to communication of the VM(s) corresponding to the host and/or to communication of the process(es) executing on the VM(s).

In some embodiments, hosts within the same data center can communicate, for instance, over a network of the data center. For example, VM 306a can communicate with host 304a and VM 308a over a network of data center 102a. Similarly, VM 306b can communicate with host 304b and VM 308b over a network of data center 102b.

In some embodiments, hosts in different data centers cannot readily communicate, for instance, as a result of policy restrictions implemented on communications between data centers. Such restrictions may, for instance, freely allow only communications between devices assigned to a same subnet or set of subnets. Thus, if VM 306a is assigned to the first subnet and VM 306b is assigned to the different second subnet (recall that VMs of different data centers may be assigned network identifiers of respective subnets), VM 306a may be unable to communicate with VM 306b, in some instances.

However, it may be desirable to enable communication between respective hosts of multiple data centers in some instances. For example, if a process (e.g., executing a virtualization manager) executing on VM 306a is unable to communicate with hosts (e.g., hosts 302b, 304b) or VMs (e.g., VMs 306b, 308b) of data center 102b, the virtualization manager may be unable to properly manage the hosts and VMs of data center 102b. As another example, if the virtualization manager fails (e.g., due to a VM failure, a host failure or a networking failure), it may be desirable to implement failover of the virtualization manager on VM 306a to a host of data center 102b. In some embodiments, failover is achieved by initiating the virtualization manager on VM 306b of data center 102b. In some embodiments, failover is achieved by initiating a new VM using any one of hosts 302b or 304b and executing the virtualization manager on the newly initiated VM.

In some embodiments, the network identifier(s) assigned to hosts and VMs of the cloud computing environment are different than network identifiers of the pool of network identifiers of the cloud computing system. For example, if the pool of network identifiers of the cloud computing system consists of the IP addresses within the Classless Inter-Domain Routing (CIDR) range of 10.0.0.0/16, one or more of hosts 302a, 304a, 302b, and 304b of the cloud computing environment may be assigned to the first network identifier 192.168.1.1 that is not within the pool of network identifiers. Because hosts 302a, 304a, 302b, and 304b may have network identifiers outside of the pool of network identifiers, hosts 302a, 304a, 302b, and 304b can thus communicate with each other. This results from the fact that the network identifiers outside of the pool of network identifiers are not restricted in the same manner as network identifiers from the pool of network identifiers (recall that communications between subnets may be restricted due to network policy).

In some embodiments, communications between devices (e.g., hosts, VMs, switches, routers, bridges, gateways) of a data center are employed by using one or more route tables. Route tables used in this manner can be the route table of any appropriate physical or virtual networking device (e.g., gateways, routers, switches, bridges, modems, multilayer switches, network interface controllers, and the like) used to implement communications within the data center.

In some embodiments, a route table associates a network identifier with a host to enable one or more other devices to communicate with the host. For example, a route table associates a network identifier with a VM executing on the host. It will be appreciated that associating a network identifier with a VM in this manner can include associating the network identifier with the virtual network interface of the VM. In other examples, a route table associates a network identifier with a process executing directly on the host (e.g., not executing on a VM of the host). As an example of associating a network identifier with a VM, a first route table of a device in data center 102a can associate the IP address 192.168.1.1 with VM 306a on host 302a. Similarly, a second route table of a device in data center 102b can associate the IP address 192.168.1.1 with VM 306a. In this way, communications sent from data center 102a (e.g., from any VM or host of data center 102a) or data center 102b with a destination address of 192.168.1.1 are routed to VM 306a, irrespective of whether communications are provided within a same data center (e.g., data center 102a) or provided between data centers (e.g., from data center 102b to data center 102a). Thus, the virtualization manager executing on VM 306a can communicate with (and thereby manage) any of hosts 304a, 302b, and 304b and VMs 308a, 306b, and 308b.

In some embodiments, during operation, an event associated with a process executing on a host is detected. For example, an event associated with virtualization manager executing on VM 306a on host 302a may be detected. In some embodiments, the event is a failure of the process on the first host of execute. Such failure may be due to a process failure, a VM failure, a hypervisor failure, a host failure (e.g., hardware failure), a network failure, a data center failure, and the like.

In some embodiments, in response to detecting the event, the process is executed (or continues to execute) on a second host. For example, if the execution of the virtualization manager on VM 306a on host 302a fails, the virtualization manager may be initiated on VM 306b on host 302b. In some embodiments, the execution of the virtualization manager may be redundant, as the virtualization manager may simultaneously be executing on VM 306b on host 302b (recall that a process may concurrently execute with redundant instances of the process on respective VMs and/or hosts). Thus, in some embodiments, if the execution of the virtualization manager on VM 306a fails, the virtualization manager on host 302b can manage the hosts and VMs of data centers 102a and 102b.

In some embodiments, the event associated with the process is a migration of the process from a first host to a second host. In some embodiments, migration of a process from the first host to the second host includes migration of the VM executing the process from the first host to the second host. For example, migrating virtualization manager executing on VM 306a on host 302a may include migrating VM 306a to host 302b.

In some embodiments, detecting the event associated with the process includes receiving, from one or more hosts, data indicative of the event. The data indicative of the event can be received by any host of a cloud computing system (e.g., hosts 302a, 304a, 302b, or 304b) or by a central server of the cloud computing system (not shown in FIG. 3). For example, host 304a can receive data from host 302a indicating that a process executing on host 302a has failed. As another example, host 304a can receive data from host 302a indicating that VM 306a on host 302a is scheduled for migration to host 302b.

In some embodiments, in response to detecting the event associated with the process, one or more route tables are updated. For example, in response to detecting that the virtualization manager on VM 306a has failed and that a new instance of the virtualization manager process is now initiated on VM 306b on host 302b, one or more route tables are updated to associate the IP address 192.168.1.1 with a virtual network interface of VM 306b. Route tables updated in this manner include route tables for all data centers of a cloud computing environment in some examples. In this way, all hosts and VMs of data centers 102a and 102b communicate with the virtualization manager now executing on VM 306b when communicating with network identifier 192.168.1.1. Thus, the virtualization manager can continue to manage the hosts and VMs of any data centers 102a and 102b, despite the failure of its execution on VM 306a.

Figure 4:
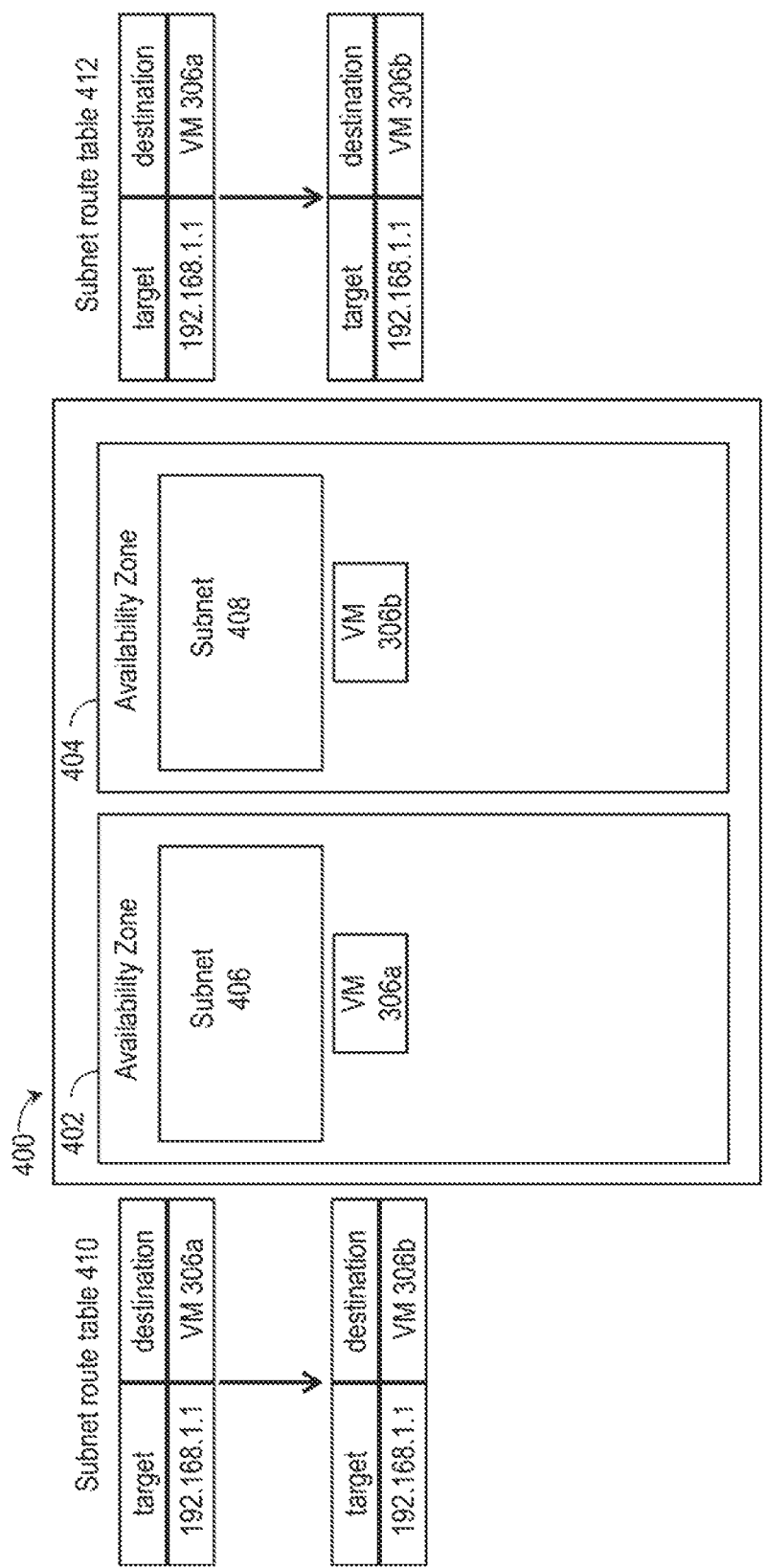
FIG. 4 depicts an exemplary virtual private cloud in which certain embodiments discussed herein may be utilized

FIG. 4 depicts an exemplary virtual private cloud 400 (e.g., implemented as cloud computing system 100) in which certain embodiments discussed herein may be utilized. A virtual private cloud (VPC) is a virtual network dedicated to a user account (e.g., an Amazon.com Inc., account). The VPC is isolated (e.g., logically isolated) from other networks (e.g., network(s) dedicated to another user's account) in the cloud (e.g., a cloud computing environment provided by Amazon Web Services Inc.). A user of VPC 400 can instantiate cloud resources, such as Amazon elastic container instances (e.g., configured to provide the processing, networking, memory, and/or storage resources discussed above) into the VPC.

VPC 400 is associated with a region (e.g., a particular geographic location specified by a user, such as the West Coast of the United States, a state, a city, a country, etc.) The region includes one or more Availability Zones (e.g., AZ 402 and AZ 404 each respectively implemented as one or more of data centers 102) that are each distinct locations within the region. Each AZ is engineered to be isolated from failures (e.g., hardware failures) in other AZs. In some embodiments, VPC 400 includes all of the AZs for a particular region. Although FIG. 4 shows VPC 400 including two AZs, it will be appreciated that VPC 400 can include any number of AZs and that the techniques discussed herein may be employed for a VPC having any number of AZs.

By launching one or more instances (e.g., instances of hosts, VMs, and the like configured to provide processing, memory, storage, and/or network resources) in separate AZs, computing process(es) supported by the instances can be protected from the failure of a single AZ (e.g., due to data center failure at a particular location). In some embodiments, the one or more instances include one or more Amazon Elastic Compute Cloud (EC2) instances (e.g., general purpose EC2 instances, compute optimized EC2 instances, memory optimized EC2 instances, and the like).

Further, it may be desirable for a process supported by the instance(s) of one AZ to communicate with the instance(s) of another AZ (e.g., to provide failover and/or migration capability for process(es) between AZs (and therefore between separate locations)).

In some embodiments, when creating VPC 400, the user specifies a pool of network identifiers associated with VPC 400. For example, the user specifies a range of IPv4 addresses for VPC 400 (e.g., as a CIDR block such as 10.0.0.0/16). In some embodiments, communications of VPC 400 (e.g., communications between hosts, data centers, VMs, etc. of VPC 400), are implemented, at least in part, using the pool of network identifiers.

In some embodiments, one or more subnets can be added to each Availability Zone. For example, AZ 402 (e.g., implemented as data center 102a) is assigned a first subnet 406 (e.g., corresponding to the first subnet discussed with respect to FIG. 3) and AZ 404 (e.g., implemented as data center 102b) is assigned to a second subnet 408 (e.g., corresponding to the second subnet discussed with respect to FIG. 3). In some examples, assigning a subnet to an AZ also assigns the subnet to the corresponding data center(s) implementing the AZ.

In some embodiments, each subnet 406 and 408 is a subset of the pool of network identifiers associated with VPC 400. For example, a user adding subnets 406 and 408 specifies the respective CIDR blocks for each of the subnets, where each respective CIDR block is a subset of the CIDR block for VPC 400. For example, subnet 406 is defined by the CIDR block of 10.0.0.0/24 and subnet 408 is defined by the CIDR block of 10.0.1.0/24 (both subsets of the CIDR block 10.0.0.0/16). In this manner, communications of AZ 402 (e.g., of data center 102a) may be implemented using subnet 406 and communications of AZ 404 (e.g., of data center 102b) may be implemented using subnet 408.

In some embodiments, due to network policy restrictions, a subnet cannot span across AZs. That is, in some embodiments, no subnet (or network identifier defined by the subnet) can be assigned to more than one AZ. For example, no network identifier defined by subnet 406 can be assigned to AZ 404. Similarly, no network identified defined by subnet 408 can be assigned to AZ 402.

In some embodiments, due to network policy restrictions, communications are only allowed between devices assigned to a same subnet or set of subnets. Accordingly, devices of AZ 402 (e.g., of data center 102a), may be unable to communicate with devices of AZ 404 (e.g., of data center 102b) if AZ 402 is assigned to subnet 406 and AZ 404 is assigned to the different subnet 408. Recall that subnets 406 and 408 are different (e.g., do not include any same network identifier), because in some embodiments, no subnet can be assigned to more than one AZ.

In view of the above network policy restrictions, it may be difficult for a computing process of one AZ to communicate with another AZ. It will be appreciated that communications of an AZ refers to communications of the data center(s) and/or instance(s) corresponding to the AZ. For example, if a virtualization manager of AZ 402 (e.g., executing on VM 306a of data center 102a) is assigned to subnet 406, the virtualization manager may be unable to communicate with AZ 404 because AZ 404 is assigned to different subnet 408. Accordingly, due to network policy restrictions, it may be difficult for a virtualization manager of AZ 402 to failover to AZ 404 (and/or to manage the computing processes of AZ 404).

In some embodiments, it may be desirable for a virtualization manager to communicate between AZs (e.g., to support failover of the virtualization manager between AZs). In some embodiments, such communication may be enabled by assigning any host and/or VM that executes (or may be used to execute) a virtualization manager a network identifier that is not included in the pool of network identifiers associated with VPC 400. For example, VM 306a (executing the virtualization manager) is assigned the IP address of 192.168.1.1 that is outside of the VPC 400 CIDR block of 10.0.0.0/16. Because VM 306a is not assigned to a network identifier of the pool of network identifiers (e.g., not assigned to subnet 406 or 408) communications of VM 306a (and thus the communications of the virtualization manager) may not be restricted due to network policy.

In some embodiments, the communications of an AZ are employed using one or more subnet route tables corresponding to the AZ (and/or respectively corresponding to the AZ's respective subnet(s)). The subnet route tables can be the route tables of any networking device used to implement communications for the AZ's corresponding data center (e.g., the route tables discussed above with respect to FIG. 3). For example, subnet route table 410 corresponds to AZ 402 and subnet route table 412 corresponds to AZ 404. Subnet route table 410 associates the IP address of 192.168.1.1 with VM 306a (and/or with host 302a) to enable AZ 402 to communicate with VM 306a. Similarly, subnet route table 412 associates the IP address of 192.168.1.1 with VM 306a (and/or with host 302a) to enable AZ 404 to communicate with VM 306a. In this way, communications sent from both AZ 402 and 404 to the IP address of 192.168.1.1 are routed to VM 306a. Thus, a virtualization manager executing on VM 306a can communicate with multiple AZs (e.g., both 402 and 404), allowing for failover of a virtualization manager across AZs (and thus failover capability between isolated geographic regions).

In some embodiments, at failover time, the virtualization manager changes hosts. For example, the virtualization manager executing on VM 306a on host 302a now executes on VM 306b of host 302b. To enable both AZs 402 and 404 to communicate with the moved virtualization manager, the subnet route tables of the AZs are updated. In particular as shown in FIG. 4, subnet route table 410 is updated to associate the IP address of 192.168.1.1 with VM 306b (or host 302b) and subnet route table 412 is updated to associate the IP addresses of 192.168.1.1 with VM 306b (or host 302b). (Recall that VM 306b may be also associated with the IP address 192.168.1.1 so that communications to/from VM 306b are not restricted by network policy). Similarly, when the virtualization manager migrates between hosts (e.g., VM 306a executing the virtualization manager migrates from host 302a to 302b), the subnet route tables of the AZs can be updated to associate the IP address 192.168.1.1 with host 302b.

Figure 5:
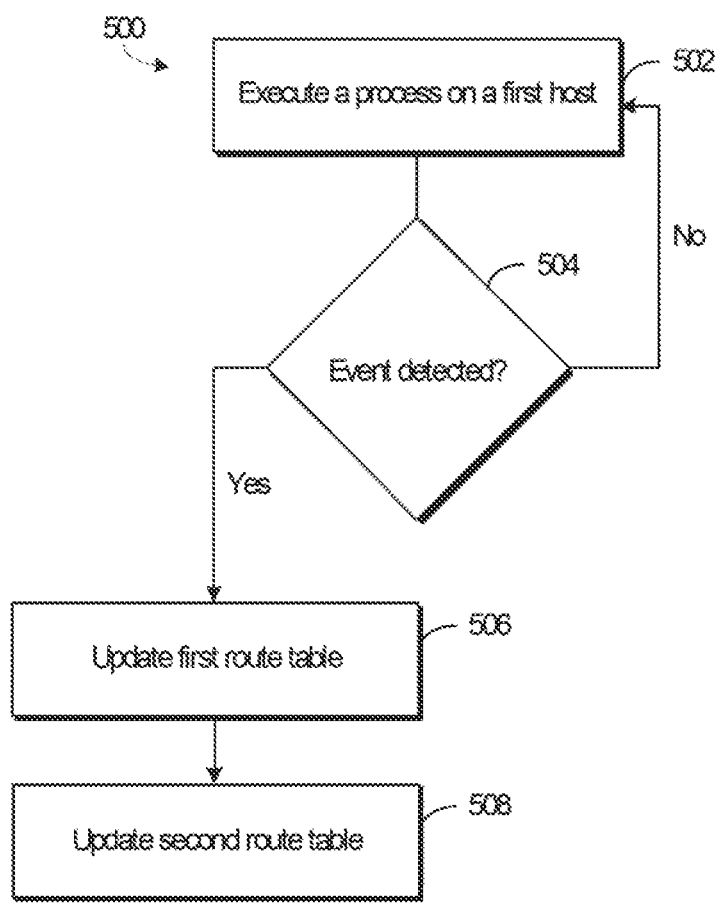
FIG. 5 illustrates an exemplary process for managing processes within a plurality of data centers configured to provide a cloud computing environment according to an embodiment of the invention.

With reference to FIG. 5, a flow chart of exemplary process 500 for managing processes within a plurality of data centers configured to provide a cloud computing environment according to an embodiment of the invention is described. In some embodiments, the cloud computing environment comprises a virtual private cloud (e.g., VPC 400). In some embodiments, process 500 is performed on a host (e.g., any one of hosts 104a, 104b, 200, 302, and 304). In some embodiments, process 500 is performed across two or more hosts. It should be recognized that in other embodiments, process 500 can be executed on a central server for a cloud computing system or can be executed across the central server and one or more hosts. It should also be recognized that although the blocks of process 500 are depicted in a particular order in FIG. 4, these blocks can be performed in other orders. Further, one or more blocks of process 500 can be optional and/or additional blocks can be performed.

At block 502, a process is executed on a first host (e.g., host 302a) of a plurality of hosts (e.g., hosts 302 and 304). In some embodiments, executing the process on the first host includes executing a virtualization manager on the first host. In some embodiments, executing the process on the first host includes executing the process on a first virtual machine (e.g., VM 306a) on the first host. In some embodiments, the process is executed on a second virtual machine (e.g., VM 306b) on a second host (e.g., host 302b) of the plurality of hosts. In some embodiments, the first and the second virtual machines may have respective first and second virtual network interfaces.

When the process is executing on the first host, a first network identifier (e.g., an IP address) associated with the plurality of hosts is not a network identifier of a pool of network identifiers associated with a cloud computing environment provided by a plurality of data centers (e.g., data centers 102a and 102b). When the process is executing on the first host, a first route table (e.g., 410) corresponding to a first data center of the plurality of data centers associates the first network identifier with the first host and a second route table (e.g., 412) corresponding to a second data center of the plurality of data centers associates the first network identifier with the first host. In some embodiments, the first route table associates the first network identifier with the first virtual network interface (e.g., of a VM executing on the first host) and the second route table associates the first network identifier with the first virtual network interface.

In some embodiments, the first data center (e.g., data center 102a) is associated with a first set of one or more network identifiers and the second data center (e.g., data center 102b) is associated with a second set of one or more network identifiers. In some embodiments, the pool of network identifiers includes each network identifier of the first set of one or more network identifiers and the second set of one or more network identifiers. In some embodiments, the first host corresponds to the first data center and the second host corresponds to the second data center.

In some embodiments, the first data center corresponds to a first set of one or more physical data centers and the second data center corresponds to a second set of one or more physical data centers. In some embodiments, each physical data center of the first set of one or more physical data centers and the second set of one or more physical data centers is located in a different physical location.

In some embodiments, the first data center corresponds to a first availability zone (e.g., AZ 402) of a region and the second data center corresponds to a second availability zone (e.g., AZ 404) of the region. In some embodiments, network policy of the cloud computing environment specifies that a subnet of the pool of network identifiers can only be assigned to a single availability zone of the region.

In some embodiments, a first plurality of subnets of the cloud computing environment correspond to the first data center and a second plurality of subnets of the cloud computing environment correspond to the second data center. In some embodiments, the first route table corresponds to a first device (e.g., a networking device) of the first data center and the second route table corresponds to a second device of the second data center.

At block 504, if an event associated with the process is detected, the process proceeds to blocks 506 and 508. At block 504, if an event associated with the process is not detected, the process returns to block 502. For example, the process continues to execute on a VM on the first host as discussed above with respect to block 502.

In some embodiments, detecting the event associated with the process includes receiving, from one or more of the plurality of hosts, data indicative of the event.

In some embodiments, the event associated with the process is a failure of the process on the first host to execute. In some embodiments, in response to detecting the failure of the process on the first host to execute, the process is executed on a second host. In some embodiments, the event associated with the process includes a migration of the process from the first host to the second host.

At block 506, in response to detecting the event associated with the process, the first route table is updated to associate the first network identifier with a second host of the plurality of hosts.

At block 508, the second route table is updated to associate the first network identifier with the second host. Although block 508 is shown as being performed after block 506, in some embodiments, block 506 is performed after block 508. In some embodiments, blocks 506 and 508 are performed concurrently, simultaneously, or in an otherwise overlapping manner (e.g., the first and the second route tables are concurrently updated).

In some embodiments, updating the first route table includes associating the first network identifier with the second virtual network interface (e.g., of a VM executing on the second host) and updating the second route table includes associating the first network identifier with the second virtual network interface.

Certain embodiments as described above may be utilized to support failing over a given management appliance (e.g., a virtualization manager) between AZs. Since management appliances live directly on the underlay software defined-network, this is not normally possible—our IPs (e.g., IP addresses) live in the management subnet. Any given subnet is confined to one AZ, and IPs are not portable across subnets. So, management IPs (and therefore VMs) are tied to a given subnet within a given AZ. More flexibility is obtained, though, by playing tricks with routing. This includes composing mythical networks that don't exist and add routes on how to reach them. This is important, because any IP that falls within a virtual private cloud (VPC)'s IP range is tightly restricted, but routes to things 'outside' of the VPC are not. Then those special IPs are associated with management VMs. Subnet route tables are relied upon to inform the VPC as to how these mythical networks should be reached.

For example, if there is a VPC CIDR of 10.0.0.0/16, one can 'trick' the VPC into thinking there's some external service living at, say, 192.168.1.1 that it can reach by sending packets to, say, ESX (e.g., ESX by VMware, Inc.) host 1's Elastic Network Interface (ENI)—this can be done by updating the subnet route table with a rule that all packets destined to 192.168.1.1 should be delivered to ESX host 1's EM. In both AZs, the method includes pointing the route tables at that same ENI that happens to currently live in some specific AZ. At failover time, when management appliance changes hosts, one needs only to update the route tables in all subnets/AZs so that 192.168.1.1 should now flow to ESX host 2's ENI instead. The same work may be done when a management appliance has to be live migrated between hosts.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for managing processes within a virtual private cloud associated with a pool of network identifiers, the method comprising:
executing a process on a first virtual machine operating in a first availability zone of the virtual private cloud, wherein when the process is executing on the first virtual machine:
a first network identifier associated with the first virtual machine is not a network identifier of the pool of network identifiers;
a first route table corresponding to the first availability zone associates the first network identifier with the first virtual machine; and
a second route table corresponding to a second availability zone of the virtual private cloud associates the first network identifier with the first virtual machine;
detecting an event associated with the process; and
in response to detecting the event associated with the process:
executing the process on a second virtual machine operating in the second availability zone; and
concurrently updating each of the first route table and the second route table to associate the first network identifier with the second virtual machine;
wherein:
the first availability zone and the second availability zone correspond to a same region; and
a network policy of the virtual private cloud specifies that a subnet of the pool of network identifiers can only be assigned to a single availability zone of the same region.

2. The method of claim 1, wherein the first network identifier is an IP address.

3. The method of claim 1, wherein the first availability zone is associated with a first set of one or more network identifiers, wherein the second availability zone is associated with a second set of one or more network identifiers different from the first set of one or more network identifiers, and wherein the pool of network identifiers includes each network identifier of the first set of one or more network identifiers and the second set of one or more network identifiers.

4. The method of claim 1, wherein executing the process on the first virtual machine comprises executing a virtualization manager on the first virtual machine.

5. The method of claim 1, wherein the event associated with the process is a failure of the process on the first virtual machine to execute.

6. The method of claim 1, wherein the event associated with the process is a migration of the process from the first virtual machine to the second virtual machine.

7. The method of claim 1, wherein:
the first availability zone corresponds to a first set of one or more physical data centers;
the second availability zone corresponds to a second set of one or more physical data centers; and
each physical data center of the first set of one or more physical data centers and the second set of one or more physical data centers is located in a different physical location.

8. The method of claim 1, wherein detecting the event associated with the process includes receiving, from a host of the first virtual machine, data indicative of the event.

9. The method of claim 1, wherein:
a first subnet of the virtual private cloud corresponds to the first availability zone; and
a second subnet of the virtual private cloud corresponds to the second availability zone.

10. The method of claim 1, wherein the first virtual machine is different from the second virtual machine.

11. The method of claim 1, wherein the first virtual machine is the second virtual machine.

12. The method of claim 1, wherein:
the first virtual machine has a first virtual network interface;
the second virtual machine has a second virtual network interface; and
concurrently updating each of the first route table and the second route table to associate the first network identifier with the second virtual machine includes updating each of the first route table and the second route table to associate the first network identifier with the second virtual network interface.

13. The method of claim 1, wherein:
the first route table corresponds to a first networking device of the first availability zone; and
the second route table corresponds to a second networking device of the second availability zone.

14. One or more non-transitory computer-readable storage media storing one or more programs configured to be executed by one or more processors for managing processes within a virtual private cloud associated with a pool of network identifiers, the one or more programs including instructions for:
executing a process on a first virtual machine operating in a first availability zone of the virtual private cloud, wherein when the process is executing on the first virtual machine:
a first network identifier associated with the first virtual machine is not a network identifier of the pool of network identifiers;
a first route table corresponding to the first availability zone associates the first network identifier with the first virtual machine; and
a second route table corresponding to a second availability zone of the virtual private cloud associates the first network identifier with the first virtual machine;
detecting an event associated with the process; and
in response to detecting the event associated with the process:
executing the process on a second virtual machine operating in the second availability zone; and
concurrently updating each of the first route table and the second route
table to associate the first network identifier with the second virtual machine;
wherein:
the first availability zone and the second availability zone correspond to a same region; and
a network policy of the virtual private cloud specifies that a subnet of the pool of network identifiers can only be assigned to a single availability zone of the same region.

15. The one or more non-transitory computer-readable storage media of claim 14, wherein the first network identifier is an IP address.

16. The one or more non-transitory computer-readable storage media of claim 14, wherein the first availability zone is associated with a first set of one or more network identifiers, wherein the second availability zone is associated with a second set of one or more network identifiers different from the first set of one or more network identifiers, and wherein the pool of network identifiers includes each network identifier of the first set of one or more network identifiers and the second set of one or more network identifiers.

17. The one or more non-transitory computer-readable storage media of claim 14, wherein executing the process on the first virtual machine comprises executing a virtualization manager on the first virtual machine.

18. The one or more non-transitory computer-readable storage media of claim 14, wherein the event associated with the process is a failure of the process on the first virtual machine to execute.

19. The one or more non-transitory computer-readable storage media of claim 14, wherein the event associated with the process is a migration of the process from the virtual machine to the second virtual machine.

20. The one or more non-transitory computer-readable storage media of claim 14, wherein:
    the first availability zone corresponds to a first set of one or more physical data centers;
    the second availability zone corresponds to a second set of one or more physical data centers; and
    each physical data center of the first set of one or more physical data centers and the second set of one or more physical data centers is located in a different physical location.

21. The one or more non-transitory computer-readable storage media of claim 14, wherein detecting the event associated with the process includes receiving, from a host of the first virtual machine, data indicative of the event.

22. The one or more non-transitory computer-readable storage media of claim 14, wherein:
    a first subnet of the virtual private cloud corresponds to the first availability zone; and
    a second subnet of the virtual private cloud corresponds to the second availability zone.

23. The one or more non-transitory computer-readable storage media of claim 14, wherein the first virtual machine is different from the second virtual machine.

24. The one or more non-transitory computer-readable storage media of claim 14, wherein the first virtual machine is the second virtual machine.

25. The one or more non-transitory computer-readable storage media of claim 14, wherein:
    the first virtual machine has a first virtual network interface;
    the second virtual machine has a second virtual network interface; and
    concurrently updating each of the first route table and the second route table to associate the first network identifier with the second virtual machine includes updating each of the first route table and the second route table to associate the first network identifier with the second virtual network interface.

26. The one or more non-transitory computer-readable storage media of claim 14, wherein:
    the first route table corresponds to a first networking device of the first availability zone; and
    the second route table corresponds to a second networking device of the second availability zone.

27. A computer system, comprising:
    one or more processors; and
    memory storing one or more programs configured to be executed by the one or more processors for managing processes within a virtual private cloud associated with a pool of network identifiers, the one or more programs including instructions for:
    executing a process on a first virtual machine operating in a first availability zone of the virtual private cloud, wherein when the process is executing on the first virtual machine:
        a first network identifier associated with the first virtual machine is not a network identifier of the pool of network identifiers;
        a first route table corresponding to the first availability zone associates the first network identifier with the first virtual machine; and
        a second route table corresponding to a second availability zone of the virtual private cloud associates the first network identifier with the first virtual machine;
    detecting an event associated with the process; and
    in response to detecting the event associated with the process:
        executing the process on a second virtual machine operating in the second availability zone; and
        concurrently updating each of the first route table and the second route
    table to associate the first network identifier with the second virtual machine;
    wherein:
        the first virtual machine has a first virtual network interface;
        the second virtual machine has a second virtual network interface; and
        concurrently updating each of the first route table and the second route table to associate the first network identifier with the second virtual machine includes updating each of the first route table and the second route table to associate the first network identifier with the second virtual network interface.

28. The computer system of claim 27, wherein executing the process on the first virtual machine comprises executing a virtualization manager on the first virtual machine.

29. The computer system of claim 27, wherein the event associated with the process is a failure of the process on the first virtual machine to execute.

30. The computer system of claim 27, wherein the event associated with the process is a migration of the process from the first virtual machine to the second virtual machine.

31. The computer system of claim 27, wherein:
    the first availability zone corresponds to a first set of one or more physical data centers;
    the second availability zone corresponds to a second set of one or more physical data centers; and
    each physical data center of the first set of one or more physical data centers and the second set of one or more physical data centers is located in a different physical location.

32. The computer system of claim 27, wherein:
    the first availability zone and the second availability zone correspond to a same region; and
    a network policy of the virtual private cloud specifies that a subnet of the pool of network identifiers can only be assigned to a single availability zone of the same region.

* * * * *